(12) United States Patent
Ogawa et al.

(10) Patent No.: US 6,788,377 B1
(45) Date of Patent: Sep. 7, 2004

(54) LIQUID CRYSTAL DEVICE AND PROJECTOR USING THE SAME

(75) Inventors: Yasunori Ogawa, Suwa (JP); Takeshi Takezawa, Matsumoto (JP); Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/598,268

(22) Filed: Jun. 21, 2000

(30) Foreign Application Priority Data

Jul. 12, 1999 (JP) .......................................... 11-197690

(51) Int. Cl.$^7$ .......................................... G02F 1/1333
(52) U.S. Cl. ........................ 349/151; 349/158; 349/161
(58) Field of Search ................................. 349/151, 158, 349/161

(56) References Cited

U.S. PATENT DOCUMENTS

| | | | |
|---|---|---|---|
| 5,032,021 A | * 7/1991 | Kanatani et al. | ............... 353/54 |
| 5,543,942 A | * 8/1996 | Mizuguchi et al. | |
| 5,835,179 A | * 11/1998 | Yamanaka | ................... 349/161 |
| 5,953,087 A | * 9/1999 | Hoyt | |
| 5,959,704 A | * 9/1999 | Suzuki et al. | ................... 349/9 |
| 5,969,832 A | * 10/1999 | Nakanishi et al. | ............ 359/15 |

FOREIGN PATENT DOCUMENTS

JP          A-10-177151         6/1998

\* cited by examiner

Primary Examiner—Robert H. Kim
Assistant Examiner—P. R. Akkapeddi
(74) Attorney, Agent, or Firm—Oliff & Berridge, PLC (57) ABSTRACT

A liquid crystal device is provided including an exit side substrate portion, an entrance side substrate portion opposed to the exit side substrate portion, and a liquid crystal layer placed between the exit side substrate portion and the entrance side substrate portion. The exit side substrate portion includes an exit side substrate on which a first electrode for driving the liquid crystal layer is formed, and an exit side cover arranged on the exit side with respect to the exit side substrate. The entrance side substrate portion includes an entrance side substrate on which a second electrode for driving the liquid crystal layer is formed, and an entrance side cover arranged on the entrance side with respect to the entrance side substrate. The absolute value of the coefficient of thermal expansion of the exit side cover is less than $37\times10^{-7}/°$ C., and more preferably not more than $10\times10^{-7}/°$ C. The absolute value of the coefficient of thermal expansion of the entrance side cover is less than $37\times10^{-7}/°$ C., and more preferably not more than $10\times10^{-7}/°$ C.

10 Claims, 4 Drawing Sheets

FIG. 2(A)
WHEN NO VOLTAGE IS APPLIED

FIG. 2(B)
WHEN VOLTAGE IS APPLIED

LIQUID CRYSTAL DEVICE AND PROJECTOR USING THE SAME

BACKGROUND OF THE INVENTION

1. Field of Invention

This invention relates to a liquid crystal device and a projector using the same.

2. Description of Related Art

A projector is an apparatus for displaying computer images, television images, etc. In a projector, light emitted from an illumination device is modulated by an electro-optical device called a light valve, and the modulated light is projected onto a screen to display an image. As the light valve of such a projector, a liquid crystal device is mainly used.

SUMMARY OF THE INVENTION

It is desirable for an image displayed by a projector to be of higher luminance.

In view of this, the illuminance of the light applied to the liquid crystal device by the illumination device is enhanced, thereby achieving an increase in luminance.

As the luminance of an image increases, a deterioration in contrast occurs and inconsistency in color is generated. This is conspicuous in the four corners of the image.

One exemplary object of this invention is to at least provide a technique for restraining the deterioration in contrast and inconsistency in color, which occurs as a result of an increase in the luminance of an image.

To solve at least a part of the above problem, there is provided, in accordance with one exemplary embodiment of the present invention, a liquid crystal device having a plurality of pixels and adapted to modulate light in accordance with a given image signal. The liquid crystal device may consist of an exit side substrate portion, an entrance side substrate portion opposed to the exit side substrate portion, and a liquid crystal layer placed between the exit side substrate portion and the entrance side substrate portion.

The exit side substrate portion of this exemplary embodiment may consist of an exit side substrate on which a first electrode for driving the liquid crystal layer is formed, and an exit side cover arranged on the exit side with respect to the exit side substrate.

The entrance side substrate portion of this exemplary embodiment may consist of an entrance side substrate on which a second electrode for driving the liquid crystal layer is formed.

In this exemplary embodiment, the absolute value of the coefficient of thermal expansion of the exit side cover is preferably less than $37 \times 10^{-7}/°$ C.

In the above liquid crystal device, the absolute value of the coefficient of thermal expansion of the exit side cover is small, so that it is possible to at least restrain deterioration in contrast and generation of inconsistency in color in an image formed by the liquid crystal device due to birefringence caused by thermal expansion of the exit side cover.

It is also desirable that the absolute value of the coefficient of thermal expansion of the exit side cover be not more than $10 \times 10^{-7}/°$ C.

This makes it possible to further restrain the deterioration in contrast and the generation of color inconsistency in the image due to the thermal expansion of the exit side cover.

In the above first liquid crystal device, it is desirable that the entrance side substrate portion consists of an entrance side cover arranged on the entrance side with respect to the entrance side substrate, the absolute value of the coefficient of thermal expansion of the entrance side cover being less than $37 \times 10^{-7}/°$ C.

Due to this arrangement, the absolute value of the coefficient of thermal expansion of the entrance side cover is small, so that it is possible to at least restrain deterioration in contrast and generation of inconsistency in color in an image formed by the liquid crystal device due to birefringence caused by thermal expansion of the entrance side cover.

It is desirable that the absolute value of the coefficient of thermal expansion of the entrance side cover be not more than $10 \times 10^{-7}/°$ C.

This makes it possible to further restrain the deterioration in contrast and the generation of color inconsistency in the image due to the thermal expansion of the entrance side cover.

In accordance with another exemplary embodiment of the present invention, there is provided a liquid crystal device having a plurality of pixels and adapted to modulate light in accordance with a given image signal. The liquid crystal device may consist of an exit side substrate portion, an entrance side substrate portion opposed to the exit side substrate portion, and a liquid crystal layer placed between the exit side substrate portion and the entrance side substrate portion.

The exit side substrate portion of this exemplary embodiment may consist of an exit side substrate on which a first electrode for driving the liquid crystal layer is formed.

The entrance side substrate portion of this exemplary embodiment may consist of an entrance side substrate on which a second electrode for driving the liquid crystal layer is formed, and an entrance side cover arranged on the entrance side with respect to the entrance side substrate.

In this exemplary embodiment, the absolute value of the coefficient of thermal expansion of the entrance side cover is preferably less than $37 \times 10^{-7}/°$ C.

In the above liquid crystal device, the absolute value of the coefficient of thermal expansion of the entrance side cover is small, so that it is possible to at least restrain deterioration in contrast and generation of inconsistency in color in an image formed by the liquid crystal device due to birefringence caused by thermal expansion of the entrance side cover.

It is also desirable that the absolute value of the coefficient of thermal expansion of the entrance side cover is not more than $10 \times 10^{-7}/°$ C.

This makes it possible to at least further restrain the deterioration in contrast and generation of color inconsistency in the image due to the thermal expansion of the entrance side cover.

In accordance with another exemplary embodiment of the present invention, there is provided a projector which may consist of a liquid crystal device having a plurality of pixels and adapted to emit light after modulating in accordance with a given image signal, an illumination system for irradiating light to the liquid crystal device, and a projection system for projecting light emitted from the liquid crystal device.

The liquid crystal device of this exemplary embodiment may consist of an exit side substrate portion, an entrance side substrate portion opposed to the exit side substrate portion, and a liquid crystal layer placed between the exit side substrate portion and the entrance side substrate portion.

The exit side substrate portion of this exemplary embodiment may consist of an exit side substrate on which a first electrode for driving the liquid crystal layer is formed, and an exit side cover arranged on the exit side with respect to the exit side substrate.

The entrance side substrate portion of this exemplary embodiment may consist of an entrance side substrate on which a second electrode for driving the liquid crystal layer is formed.

In this exemplary embodiment, the absolute value of the coefficient of thermal expansion of the exit side cover is preferably less than $37 \times 10^{-7}/°$ C.

It is also desirable that the absolute value of the coefficient of thermal expansion of the entrance side cover be less than $37 \times 10^{-7}/°$ C.

The above first projector is equipped with the first liquid crystal device of the present invention, so that it is possible to at least restrain deterioration in contrast and generation of color inconsistency due to thermal expansion of the exit side cover and the entrance side cover.

In accordance with another exemplary embodiment of the present invention, there is provided a projector which may consist of a liquid crystal device having a plurality of pixels and adapted to emit light after modulating in accordance with a given image signal, an illumination system for irradiating light to the liquid crystal device, and a projection system for projecting light emitted from the liquid crystal device.

The liquid crystal device of this exemplary embodiment may consist of an exit side substrate portion, an entrance side substrate portion opposed to the exit side substrate portion, and a liquid crystal layer placed between the exit side substrate portion and the entrance side substrate portion.

The exit side substrate portion being of this exemplary embodiment may consist of an exit side substrate on which a first electrode for driving the liquid crystal layer is formed.

The entrance side substrate portion of this exemplary embodiment may consist of an entrance side substrate on which a second electrode for driving the liquid crystal layer is formed, and an entrance side cover arranged on the entrance side with respect to the entrance side substrate.

In this exemplary embodiment, the absolute value of the coefficient of thermal expansion of the entrance side cover is preferably less than $37 \times 10^{-7}/°$ C.

The above projector is equipped with the liquid crystal device of the present invention, so that it is possible to at least restrain deterioration in contrast and generation of color inconsistency due to thermal expansion of the entrance side cover.

DETAILED DESCRIPTION OF PREFERRED EMBODIMENTS

A. Construction of Liquid Crystal Device

Figure 1A:
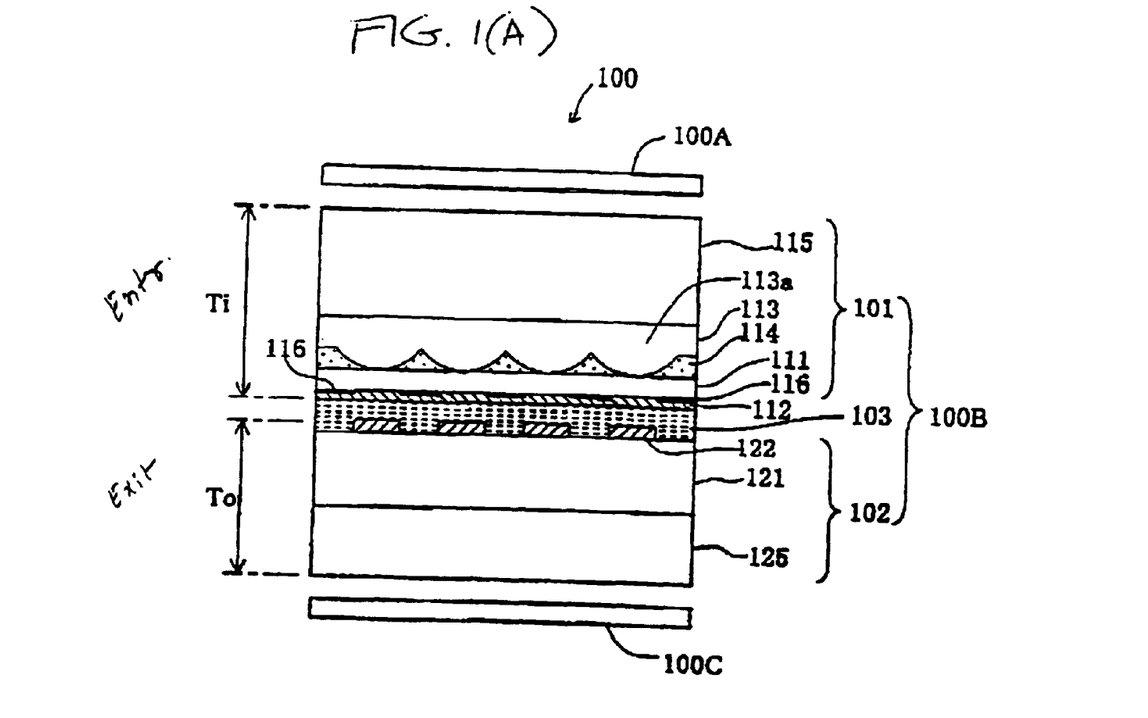
FIGS. 1(A)–(B) are diagrams showing the construction of a liquid crystal device of an exemplary embodiment of the present invention.
Figure 1B:
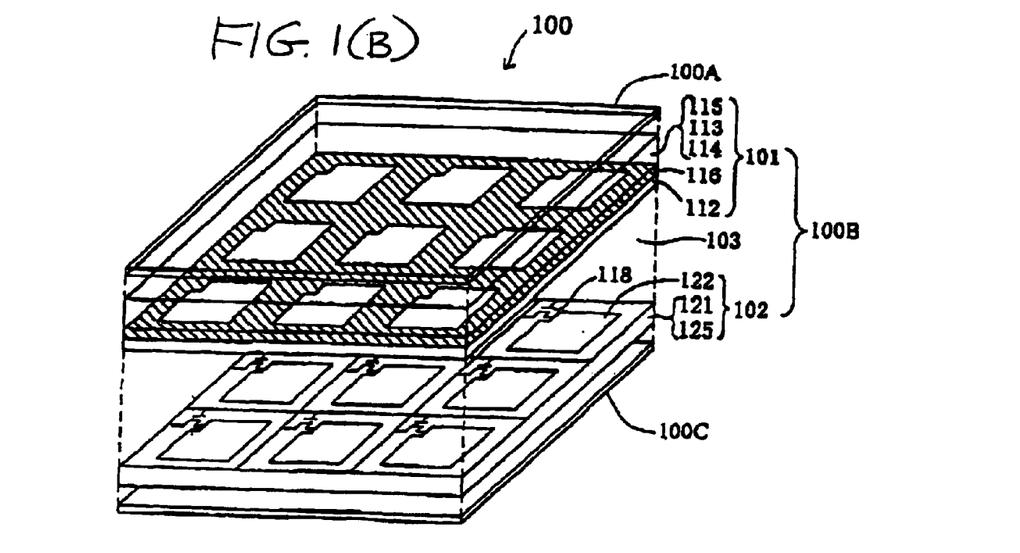

FIG. 1(A) is a schematic sectional view showing the construction of a liquid crystal device 100 according to an exemplary embodiment of the present invention, and FIG. 1(B) is a schematic perspective view showing the construction of a part of the liquid crystal device 100.

The liquid crystal device 100 is composed of a liquid crystal panel 100B, a polarizer 100A provided on the entrance side thereof, and a polarizer 100C provided on the exit side thereof The liquid crystal panel 100B is equipped with a transparent exit side substrate 121 and a transparent entrance side substrate 111, with a liquid crystal layer 103 therebetween. A common electrode 112 is provided on a side surface of the entrance side substrate 111 facing the liquid crystal 103. Thin film transistors 118 and a plurality of transparent pixel electrodes 122 are provided on the side surface of the exit side substrate 121 facing liquid crystal layer 103. The thin film transistors 118 are provided in the periphery of the plurality of pixel electrodes 122 arranged in a matrix, and are electrically connected to the pixel electrodes 122. Each pixel is formed by one pixel electrode 122, the common electrode 112 and the liquid crystal layer 103 placed therebetween. Between the entrance side substrate 111 and the common electrode 112, there is provided a light-shielding portion (BM) 116 in such a manner so as to separate the pixels from each other. The BM 116 serves to prevent light from impinging upon the thin film transistors and the wiring. The liquid crystal device 100, constructed as described above, is called an active-matrix type liquid crystal device. The exit side substrate 121 and the entrance side substrate 111 are further equipped with an alignment film (not shown) for aligning the liquid crystal molecules forming the liquid crystal layer 103. The liquid crystal device 100 of the present invention is a TN mode liquid crystal device, whose alignment film is formed such that the arrangement direction of the liquid crystal molecules on the side of the exit side substrate 121 makes an angle of approximately 90 degrees with respect to the arrangement direction of the liquid crystal molecules on the side of the entrance side substrate 111.

A micro-lens array 113 is glued to the surface of the entrance side substrate 111 on the side opposite to the liquid crystal layer 103 by an optical adhesive 114. The micro-lens array 113 has a plurality of micro-lenses 113*a*, and each micro-lens 113*a* is arranged so as to condense light on each pixel. This micro-lens array 113 may be omitted. However, each micro-lens 113*a* condenses light on each corresponding pixel to improve the light utilization efficiency, so that it is more desirable for the micro-lens array 113 to be provided.

An entrance side cover 115 is glued to the surface of the micro-lens array 113 on the opposite side of the entrance side substrate 111 by an optical adhesive. An exit side cover 125 is glued to the surface of the exit side substrate 121 on the opposite side of the liquid crystal layer 103 by means of an optical adhesive. The elements 115, 113 and 112 provided on the entrance side with respect to the liquid crystal layer 103 correspond to an entrance side substrate portion 101. The elements 122, 121 and 125 provided on the exit side with respect to the liquid crystal layer 103 correspond to an exit side substrate portion 102.

The thickness Ti of the entrance side substrate portion 101 is set to be larger than the thickness To of the exit side substrate portion 102. This is for the following reason: since the light condensed by the micro-lenses 113a impinge upon the liquid crystal layer 103, the light emitted from the liquid crystal layer 103 diverges due to the action of the micro-lenses 113a. In this case, as compared with the case of a liquid crystal device with no micro-lenses, the light emitted from the liquid crystal device 100 spreads to a larger degree, so that the influence of dust on the exit surface of the liquid crystal device 100 is reduced, whereby the influence of the dust on the entrance surface of the liquid crystal device 100 tends to be greater than the influence of the dust on the exit surface thereof. In view of this, the above arrangement is adopted, in which the entrance side surface of the liquid crystal device 100 is spaced farther apart from the liquid crystal layer 103 than the exit side surface thereof, so that it is possible to reduce the influence of the dust adhering to the entrance side surface of the liquid crystal device 100 such that it gets closer to the influence of the dust adhering to the exit side surface of the liquid crystal device 100, whereby it is possible to restrain the deterioration in the image quality due to the dust adhering to the surface of the liquid crystal device.

Outside the entrance side cover 115 and the exit side cover 125, there are respectively provided polarizers 100A and 100C which serve as polarizing elements for selectively transmitting only one kind of linear polarization component. It is desirable for these polarizers 100A and 100C to be spaced apart from the device, and held in place by a suitable holding fixture, frame or structure (not shown) between, or surrounding, the polarizers 100A and 100C, and the liquid crystal panel 100B, since the heat generated in the polarizers 100A and 100C can adversely affect the liquid crystal panel 100B. However, when the influence of the heat on the liquid crystal panel 100B is of a permissible degree, they may be glued to the entrance side cover 115 and the exit side cover 125. Further, it is also possible to glue one of the polarizers 100A and 100C to the entrance side cover 115 or the exit side cover 125, arranging the other polarizer spaced apart from the associated side cover, and held in place by a suitable holding fixture, frame or structure (not shown) between, or surrounding, that polarizer and the liquid crustal panel 100B. In some cases, only the liquid crystal panel 100B portion is referred to as the liquid crystal device. In this embodiment, however, the combination of the liquid crystal panel 100B and the polarizers 100A and 100C is referred to as the liquid crystal device 100.

The exit side substrate 121 and the entrance side substrate 111 are formed of an optical glass having the absolute value of the coefficient of thermal expansion which is not more than $10 \times 10^{-7}/°$ C., for example, quartz glass or neoceram. The entrance side cover 115 and the exit side cover 125 are also formed of an optical glass of not more than $10 \times 10^{-7}/°$ C.

Figure 2A:
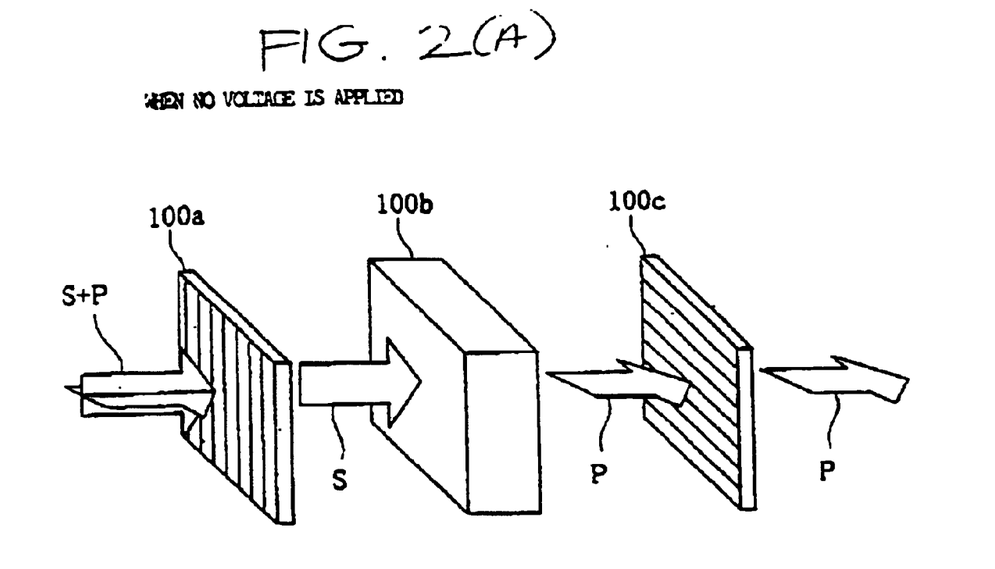
FIGS. 2(A)–(B) are diagrams illustrating an exemplary operation principle of a liquid crystal device using TN liquid crystal in accordance with an exemplary embodiment of the present invention.
Figure 2B:
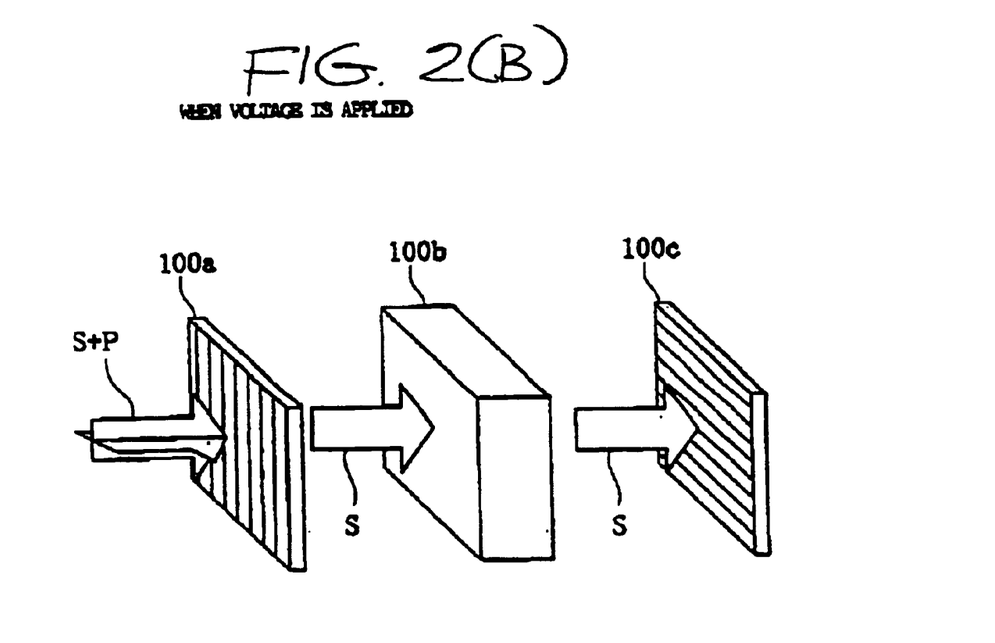

FIGS. 2(A)–(B) are diagrams illustrating an exemplary operation principle of the liquid crystal device 100. FIGS. 2(A)–(B) are exploded views showing a portion corresponding to one pixel of the liquid crystal device 100. Each pixel of the liquid crystal device 100 is composed of a liquid crystal cell 100b, an entrance side polarizer 100a provided on the entrance surface side of the liquid crystal cell 100b, and an exit side polarizer 100c provided on the exit surface side of the liquid crystal cell 100b. The liquid crystal cell 100b corresponds to one pixel portion of the liquid crystal panel 100B of FIG. 1. The directions of a plurality of parallel lines shown on the polarizers 100a and 100c indicate the directions of the transmission axes of linear polarized light transmitted through the polarizers. The transmission axes of the entrance side polarizer 100a and the exit side polarizer 100c are set to be perpendicular to each other. In FIGS. 2(A)–(B), the transmission axis of the entrance side polarizer 100a is set in the direction of s-polarized light, and the transmission axis of the exit side polarizer 100c is set in the direction of p-polarized light.

When unpolarized light (s-polarized light+p-polarized light) impinges upon the entrance side polarizer 100a, the polarized light in the direction (the direction of p-polarized light) of the axis (hereinafter also referred to as "absorption axis" or "reflection axis") perpendicular to the transmission axis is absorbed or reflected, and only polarized light in a direction substantially parallel to the transmission axis, that is, only s-polarized light is emitted. The s-polarized light emitted from the entrance side polarizer 100a is converted as shown in FIGS. 2(A) and 2(B) by a voltage supplied to the liquid crystal cell 100b.

When, as shown in FIG. 2(A), no voltage is supplied to the liquid crystal cell 100b, that is, when the liquid crystal cell 100b is in the OFF state, conversion to p-polarized light, perpendicular to s-polarized light results. The transmission axis of the exit side polarizer 100c is set in the direction of p-polarized light, so that substantially the light emitted from the liquid crystal cell 100b is transmitted and emitted from the polarizer 100c.

On the other hand, as shown in FIG. 2(B), when voltage is supplied to the liquid crystal cell 100b, that is, when the liquid crystal cell 100b is in the ON state, s-polarized light, which is the same as the incident light, is emitted from the liquid crystal cell 100b. However, since the transmission axis of the exit side polarizer 100c is set in the direction of p-polarized light, the s-polarized light emitted from the liquid crystal cell 100b, is absorbed or reflected by the polarizer 100c to be cut off. The liquid crystal cell can be in an intermediate state between the OFF state and the ON state according to the voltage applied, whereby in the liquid crystal device 100, the polarization light component emitted is controlled by supplying voltage varying according to an image signal to the liquid crystal cell 100b, thereby generating a variation in luminance in accordance with the image signal.

While in the case described with reference to FIGS. 2(A)–(B), the transmission axes of the entrance side polarizer 100a and the exit side polarizer 100c are set to be perpendicular to each other, that is, light is transmitted in the OFF state, there is also a case in which setting is made such that light is transmitted in the ON state. In this case, the transmission axis of the exit side polarizer 100c is set in a direction substantially parallel with the transmission axis of the entrance side polarizer 100a.

In this way, the liquid crystal device 100 modulates predetermined linear polarized light in accordance with a given image signal, thereby generating light representing the image.

Incidentally, it has become clear that the deterioration in contrast and inconsistency in color generated as a result of an increase in the luminance of an image occurs for the following reasons.

Figure 3:
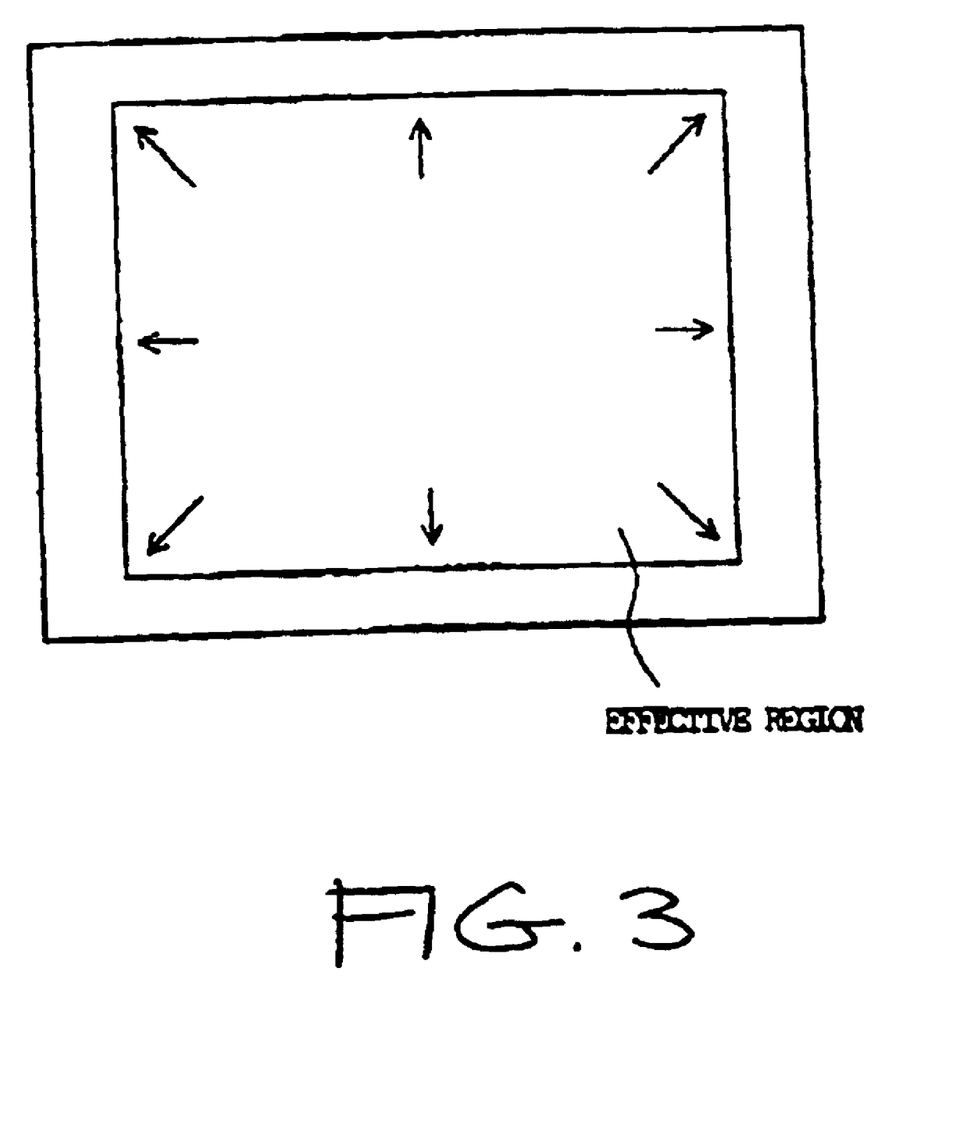
FIG. 3 is a diagram showing a screen of a liquid crystal device.

FIG. 3 is a diagram illustrating the screen of a liquid crystal device. When illuminating light is irradiated to an effective region of the liquid crystal device, heat is generated by the light applied to the common electrode (See common electrode 112 in FIG. 1) in the liquid crystal device. Due to this heat, the members used in the liquid crystal device undergo thermal expansion, and a distortion which increases toward the periphery of the effective region is generated as shown in FIG. 3. In the light passing the member in which this distortion has been generated, birefringence is generated in accordance with the amount of distortion. When this birefringence is generated, a linear polarized light, for example, is converted to a polarized light including two linear polarized lights having different polarizing directions.

As described with reference to FIGS. 2(A)–(B), the liquid crystal device 100 modulates the linear polarized light aligned by the entrance side polarizer 100a in the liquid crystal cell 100b, and modulates the quantity of light passing the exit side polarizer 100c, thereby generating light representing an image. As described above, when birefringence is generated in a member constituting the liquid crystal device, the quantity of light usable in the liquid crystal device decreases, and the quantity of unusable light increases. For example, when displaying a black image, it is ideal that no light should be emitted from the liquid crystal device. However, in some cases, light is allowed to be emitted from the liquid crystal device by the generation of birefringence. When displaying a white image, on the other hand, the quantity of light emitted from the liquid crystal device decreases. As a result, a deterioration in contrast occurs. When this deterioration in contrast occurs, an inconsistency in color is generated in a liquid crystal device equipped with a color filter. Also in the case of a projection display device displaying a color image by using three liquid crystal devices, an inconsistency in color occurs due to a variation in the deterioration in contrast among the liquid crystal devices.

As described above, an optical glass is used in the entrance side substrate, the exit side substrate, the entrance side cover and the exit side cover. The coefficient of thermal expansion of the optical glass does not depend on position and is substantially constant, so that the distortion due to thermal expansion increases toward the periphery, and the deterioration in contrast and the generation of inconsistency in color is remarkable in the four corners of the screen.

In the entrance side substrate and the exit side substrate of a conventional liquid crystal device, an optical device having a coefficient of thermal expansion whose absolute value is not more than $10 \times 10^{-7}/°$ C. is used, and the generation of distortion due to thermal expansion occurs to a small degree. However, in the exit side cover and the entrance side cover of the conventional liquid crystal device, an optical glass having a coefficient of thermal expansion whose absolute value is as large as $37 \times 10^{-7}/°$ C. is used, and a great distortion due to thermal expansion is generated in the exit side cover and the entrance side cover. Thus, it has become clear that the deterioration in contrast and the inconsistency in color, which has been a problem in the conventional liquid crystal device, is attributable to the thermal expansion of the exit side cover and the entrance side cover.

In contrast, the liquid crystal device 100 of the present invention uses an optical glass having a coefficient of thermal expansion whose absolute value is as small as not more than $10 \times 10^{-7}/°$ C. for the entrance side cover 115 and the exit side cover 125, so that it is possible to at least restrain the deterioration in contrast and the inconsistency in color due to their thermal expansion.

While in the above-described embodiment an optical glass having a coefficient of thermal expansion whose absolute value is not more than $10 \times 10^{-7}/°$ C. is used for the entrance side cover 115 and the exit side cover 125, this should not be construed restrictively. What is important is to use a member having a coefficient of thermal expansion whose absolute value is smaller than $37 \times 10^{-7}/°$ C., which is the absolute value of the thermal expansion of the member used in the conventional liquid crystal device. This makes it possible to restrain the deterioration in contrast and the inconsistency in color due to thermal expansion as compared to the conventional liquid crystal device.

Further, while in the above-described embodiment, an optical glass having a small coefficient of thermal expansion is used for both the entrance side cover 115 and the exit side cover 125, this should not be construed restrictively. It suffices for a material having a thermal expansion whose absolute value is less than $37 \times 10^{-7}/°$ C. to be used for at least one of them.

B. Projector

In the following, an exemplary embodiment of the present invention will be described with reference to drawings. In the following description, the direction of light is referred to as the z-direction, the three-o'clock direction as seen from the direction of light (z-direction) is referred to as the x-direction, and the twelve-o'clock direction is referred to as the y-direction.

Figure 4:
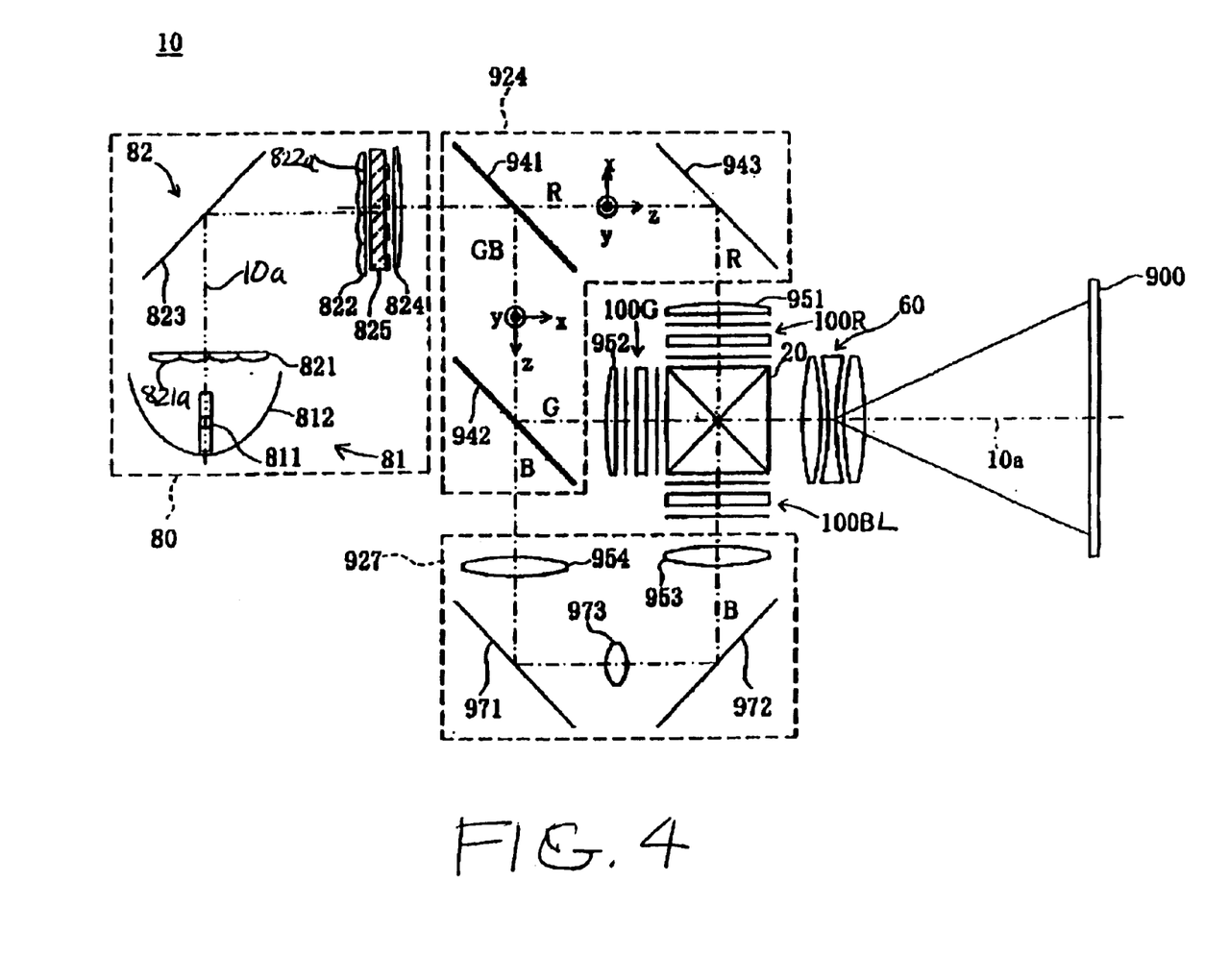
FIG. 4 is a schematic plan view showing the main part of an exemplary system of a projector using a liquid crystal device of FIG. 1.

FIG. 4 is a schematic plan view showing the main part of an exemplary system of a projector 10 using the liquid crystal device 100 of an exemplary embodiment of the present invention. The projector 10 may consist of an illumination system 80, a color separation system 924, a light guide system 927, three liquid crystal devices 100R, 100G and 100BL, a cross-dichroic prism 20, and a projection system 60. In the projector 10, light emitted from the illumination system 80 is separated into lights of three colors, red (R), green (G) and blue (B) by the color separation system 924. Each color light thus obtained through separation is modulated through the liquid crystal devices 100R, 100G and 100BL in accordance with image information. The modulated color lights is synthesized by the cross-dichroic prism 20 and an image is displayed on a screen 900 through the projection system 60.

The illumination system 80 may consist of a light source 81 and an optical integrator system 82. The light source 81 may consist of a light source lamp 811 serving as a radiation light source for emitting radiant light, and a concave mirror 812 for emitting the radiant light from the light source lamp 811 as a substantially parallel beam. As the light source lamp 811, a metal halide lamp or a high pressure mercury lamp is usually used. As the concave mirror 812, a parabolic mirror is used. It is also possible to use an ellipsoidal mirror or a spherical mirror to use the light emitted from the light source 81 as condensed light or divergent light.

The optical integrator system 82 may consist of a first lens array 821, a second lens array 822, a polarization conversion system 825 and a superimposing lens 824. Further, the optical integrator system 82 may consist of a reflection mirror 823, which bends the optical axis 10a of the light emitted from the first lens array 821 substantially at right angles. The second lens array 822 and the superimposing lens 824 are arranged so as to be substantially orthogonal to the first lens array 821, with the reflection mirror 823 being therebetween. It is also possible to arrange the light source 81 and the first lens array 821 substantially parallel with the second lens array 822, omitting the reflection mirror 823.

The optical integrator system 82 serves to substantially uniformly illuminate the three liquid crystal devices 100R, 100R and 100BL, which are the illumination regions. The first lens array 821 serves to divide the light emitted from the light source 81 into a plurality of partial beams by small lenses 821a arranged in a matrix and having a substantially rectangular contour. The second lens array 822 serves to make the central axes of the partial beams parallel with the system optical axis 10a by small lenses 822a arranged in correspondence with the first lens array 821 and having a substantially rectangular contour. When the parallelism of the light from the light source is superior, it is also possible to omit the second lens array 822.

The polarization conversion system 825 serves to convert the partial non-polarized beams emitted from the second lens array 822 into a predetermined linear polarized light (s-polarized light or p-polarized light). The polarizing direction of this predetermined linear polarized light is set to be parallel with the transmission axes of polarizers arranged on the entrance side of the liquid crystal devices 100R, 100G and 100BL. Due to this arrangement, it is possible to efficiently utilize the light from the illumination system 80 as the illumination light for the liquid crystal devices.

The superimposing lens 824 serves to substantially superimpose the plurality of partial beams which have passed through the first and second lens arrays 821 and 822 and the polarization conversion system 825 on the liquid crystal devices 100R, 100G and 100BL, which are the illumination regions.

The construction and function of the polarization conversion system and the illumination system using the same are described in detail in, for example, Japanese Unexamined Patent Application Publication No. 10-177151 filed by the present applicant, so a description thereof will be omitted.

The color separation system 924 may consist of two dichroic mirrors 941 and 942 and a reflection mirror 943, and serves to separate the light from the illumination system 80 into three color lights of red (R), green (G) and blue (B). The first dichroic mirror 941 allows the red color light component emitted from the illumination system 80 to be transmitted therethrough, and reflects the blue color light component and the green color light component. The red color light R transmitted through the first dichroic mirror 941 is reflected by the reflection mirror 943 and passes through a field lens 951 before it reaches the liquid crystal device 100R for the red color light. This field lens 951 performs conversion such that the partial beams emitted from the second lens array 822 become substantially parallel beams. Field lenses 952 and 953 provided in front of the other liquid crystal devices 100G and 100B function in a similar manner.

Of the blue color light B and the green color light G reflected by the first dichroic mirror 941, the green color light G is reflected by the second dichroic mirror 942, passes through the field lens 952, and reaches the liquid crystal device 100G for the green color light. On the other hand, the blue color light B transmitted through the second dichroic mirror 942 impinges upon the light guide system 927. The blue color light impinging upon the light guide system 927 passes through an entrance side lens 954, a relay lens 973, reflection mirrors 971 and 972, and an exit side lens (field lens) 953, which are provided in the light guide system 927, and reaches the liquid crystal device 100BL for the blue color light. Here, the reason for using the light guide system for the blue color light is to prevent a deterioration in the utilization efficiency of light, the optical path for the blue color light being longer than the optical paths for the other color lights. That is, the blue color light impinging upon the entrance side lens 954 is conveyed as it is to the exit side lens 953. The optical distances of the color lights emitted from the illumination system 80 are set to be substantially equal.

The three liquid crystal devices 100R, 100G and 100BL function as light modulating elements for modulating the three color lights in accordance with given image information (image signals) to form an image. The cross-dichroic prism 20 functions as a color light synthesis system, which serves to synthesize the three color lights modulated through the liquid crystal devices 100R, 100G and 100BL to form a color image. In the cross-dichroic prism 20, a dielectric multi-layer film reflecting the red color light and a dielectric multi-layer film reflecting the blue color light are formed on the interfaces of the four right-angle prisms substantially in an X-shaped configuration. By these dielectric multi-layer films, the three color light are synthesized, and a synthesized light for projecting a color image is formed. The synthesized light generated in the cross-dichroic prism 20 is emitted in the direction of a projection system 60. The projection system 60 projects the synthesized light emitted from the cross-dichroic prism 20, and displays a color image on a screen 900. It is possible to use a telecentric lens as the projection system 60.

Since the above-described projector 10 uses the liquid crystal device 100 of the above embodiment, it is possible to at least restrain the deterioration in contrast and the inconsistency in color of the image displayed.

This invention is not restricted to the above embodiments, and various modifications are possible without departing from the gist of the invention. For example, the following modifications are possible.

(1) While in the above embodiments, an active matrix type liquid crystal device is described by way of example, the present invention is also applicable to a direct matrix type liquid crystal device. In this case also, it is possible to obtain the same effect as that of a liquid crystal device. Further, while in the above embodiments, a TN liquid crystal is used in the liquid crystal device, this should not be construed restrictively. For example, it is also possible to use an STN liquid crystal.

(2) While in the above embodiments, the liquid crystal device of the present invention is applied to a projector for displaying color images, it is also possible to apply the liquid crystal device of this invention to a projector for displaying monochrome images. In this case also, it is possible to achieve the same effect as that of the above projector.

(3) The liquid crystal device of the present invention is applicable not only to a projector but also to a direct view type display apparatus. In this case also, it is possible to achieve the same effect as that of the above projector.

What is claimed is:

1. A liquid crystal device having a plurality of pixels that modulates light in accordance with a given image signal, the liquid crystal device comprising:

an exit side substrate portion;

an entrance side substrate portion opposed to the exit side substrate portion;

a liquid crystal layer placed between the exit side substrate portion and the entrance side substrate portion;

the exit side substrate portion comprising an exit side substrate, a first electrode that drives the liquid crystal layer formed on the exit side substrate, and an exit side cover arranged on an exit side with respect to the exit side substrate;

the entrance side substrate portion comprising an entrance side substrate and a second electrode that drives the liquid crystal layer formed on the entrance side substrate;

the exit side cover having an absolute value of a coefficient of thermal expansion of less than $37 \times 10^{-7}/°$ C. to restrain deterioration in image quality due to thermal expansion of the exit side cover; and an exit side polarizer spaced apart from the exit side cover and held in place by a structure to maintain consistent spacing between the exit side polarizer and the exit side cover such that heat generated in the exit side polarizer does not cause deterioration in image quality of the liquid crystal panel due to thermal expansion of the individual components, such deterioration including deterioration in contrast or inconsistency in color generated at the four corners of the image.

2. A liquid crystal device according to claim 1, wherein the absolute value of the coefficient of thermal expansion of the exit side cover is not more than $10 \times 10^{-7}/°$ C. to restrain deterioration in image quality due to thermal expansion of the exit side cover.

3. A liquid crystal device according to claim 1, wherein the entrance side substrate portion is equipped with an entrance side cover arranged on the entrance side with respect to the entrance side substrate, the absolute value of the coefficient of thermal expansion of the entrance side cover being less than $37 \times 10^{-7}/°$ C. to restrain deterioration in image quality due to thermal expansion of the entrance side cover.

4. A liquid crystal device according to claim 1, wherein the entrance side substrate portion is equipped with an entrance side cover arranged on the entrance side with respect to the entrance side substrate, the absolute value of the coefficient of thermal expansion of the entrance side cover being not more than $10 \times 10^{-7}/°$ C. to restrain deterioration in image quality due to thermal expansion of the entrance side cover.

5. A projector for displaying an image by projecting it, comprising:

a liquid crystal device having a plurality of pixels that emits light after modulating in accordance with a given image signal;

an illumination system that irradiates light to the liquid crystal device; and a projection system that projects light emitted from the liquid crystal device, the liquid crystal device comprising:

an exit side substrate portion;

an entrance side substrate portion opposed to the exit side substrate portion;

a liquid crystal layer placed between the exit side substrate portion and the entrance side substrate portion;

the exit side substrate portion comprising an exit side substrate on which a first electrode that drives the liquid crystal layer formed on the exit side substrate, and an exit side cover arranged on an exit side with respect to the exit side substrate;

the entrance side substrate portion comprising an entrance side substrate and a second electrode that drives the liquid crystal layer formed on the entrance side substrate;

the exit side cover having an absolute value of a coefficient of thermal expansion of less than $37 \times 10^{-7}/°$ C. to restrain deterioration in image quality due to thermal expansion of the exit side cover; and an exit side polarizer spaced apart from the exit side cover and held in place by a structure to maintain consistent spacing between the exit side polarizer and the exit side cover such that heat generated in the exit side polarizer does not cause deterioration in image quality of the liquid crystal panel due to thermal expansion of the individual components, such deterioration including deterioration in contrast or inconsistency in color generated at the four corners of the image.

6. A projector according to claims 5, wherein the absolute value of the coefficient of thermal expansion of the exit side cover is not more than $10 \times 10^{-7}/°$ C. to restrain deterioration in image quality due to thermal expansion of the exit side cover.

7. A projector according to claim 5, wherein the entrance side substrate portion is equipped with an entrance side cover arranged on the entrance side with respect to the entrance side substrate, the absolute value of the coefficient of thermal expansion of the entrance side cover being less than $37 \times 10^{-7}/°$ C. to restrain deterioration in image quality due to thermal expansion of the entrance side cover.

8. A projector according to claim 5, wherein the entrance side substrate portion is equipped with an entrance side cover arranged on the entrance side with respect to the entrance side substrate, the absolute value of the coefficient of thermal expansion of the entrance side cover being not more than $10 \times 10^{-7}/°$ C. to restrain deterioration in image quality due to thermal expansion of the entrance side cover.

9. A projector according to claim 5, wherein deterioration in image quality due to thermal expansion comprises at least one of deterioration in contrast and inconsistency in color generated.

10. A liquid crystal device according to claim 1, wherein deterioration in image quality due to thermal expansion comprises at least one of deterioration in contrast and inconsistency in color generated.

* * * * *